F. E. CHURCH.
STEERING KNUCKLE.
APPLICATION FILED JULY 23, 1914.
1,225,110.
Patented May 8, 1917.
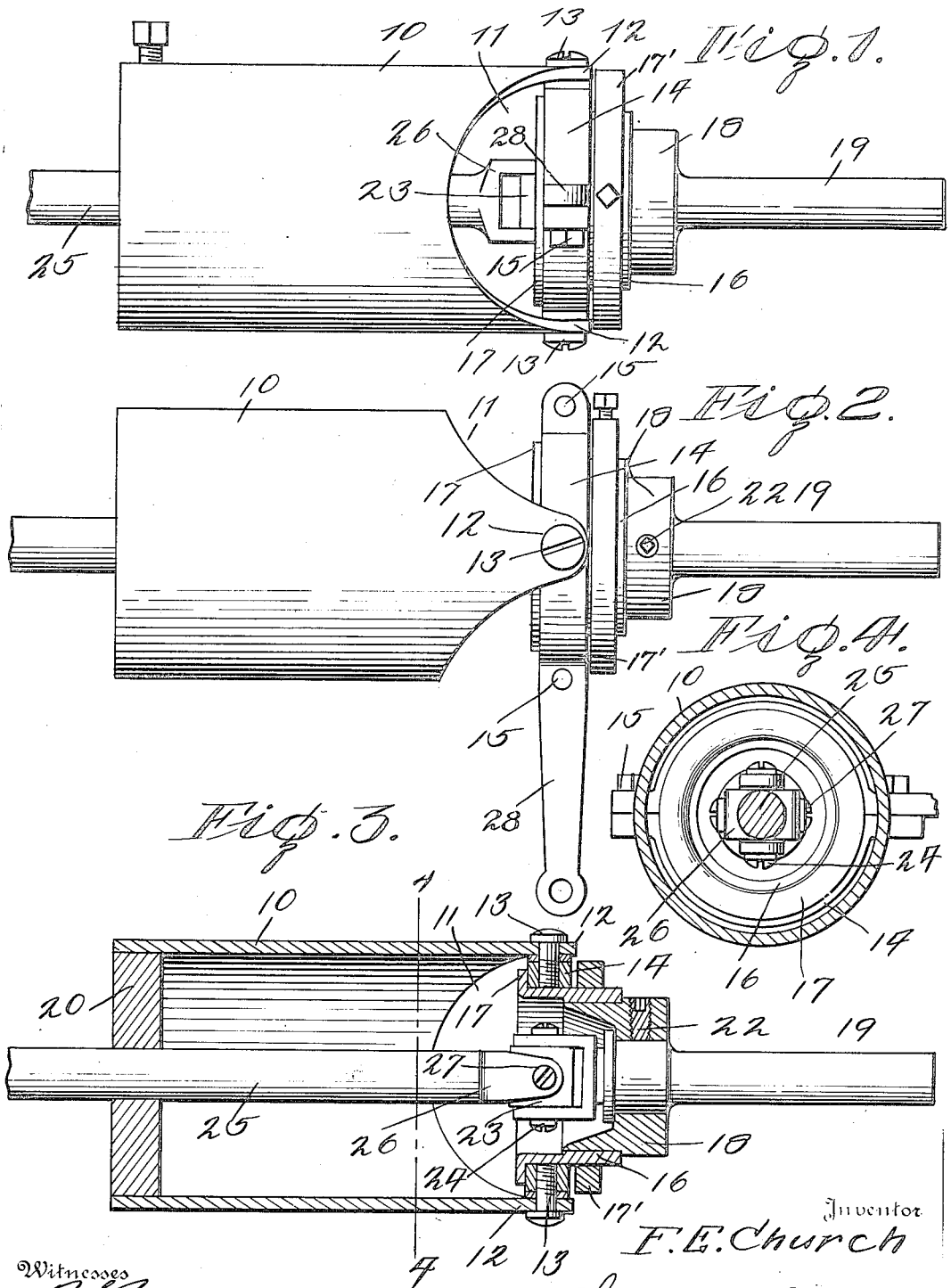

UNITED STATES PATENT OFFICE.

FRANK E. CHURCH, OF CLINTONVILLE, WISCONSIN.

STEERING-KNUCKLE.

1,225,110.  Specification of Letters Patent.  Patented May 8, 1917.

Application filed July 23, 1914. Serial No. 852,691.

*To all whom it may concern:*

Be it known that I, FRANK E. CHURCH, a citizen of the United States, residing at Clintonville, in the county of Waupaca, State of Wisconsin, have invented certain new and useful Improvements in Steering-Knuckles; and I do hereby declare the following to be a full, clear, and exact description of the invention, such as will enable others skilled in the art to which it appertains to make and use the same.

This invention relates to steering knuckles of the heavy duty type such as are adapted for use in connection with motor trucks, the steering knuckles being used especially for front drive vehicles.

The principal object of the invention is to improve and simplify the general construction of devices of this character.

A second object of the invention is to provide an extremely strong and durable steering knuckle that will not easily get out of order.

A third object of the invention is to provide a universal joint arranged in connection with a steering knuckle for front drive vehicles, the whole being of novel and improved character.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views and:—

Figure 1 is a side elevation of a steering knuckle of this character, only the knuckle and parts immediately adjacent thereto being shown, the wheel and driving mechanism being omitted.

Fig. 2 is a plan view thereof.

Fig. 3 is a longitudinal median section therethrough.

Fig. 4 is a section on the line 4—4 of Fig. 3.

In carrying out the objects of this invention I provide supporting means therefor which is preferably in the form of a sleeve 10 having oppositely disposed cut away portions 11 so as to leave two lugs 12 arranged in vertical alinement. Secured pivotally to these lugs 12, by means of the pivots 13, is a two part ring 14 the parts of which are secured together by bolts or screws 15. Mounted revolubly in this ring is a spindle casing consisting of the hollow body portion 16 and the flange 17. A collar 17' is also mounted on the hollow body portion 16 on the side of the ring 14 opposite the flange 17 so that the ring 14 is held between this flange and the collar 17'. A collar ring 18 is suitably mounted in the spindle casing and carries the spindle 19. Mounted in the other end of the sleeve 10 is a bearing 20 having a centrally disposed opening therethrough. The spindle 19 is fixed to the collar ring by means of a set screw 22 and the inner end of this spindle is forked. In this forked end is mounted a block 23 which is pivotally secured by means of the pivots 24. At 25 is a shaft which extends through the bearing in the other end of the sleeve and constitutes a drive shaft. This shaft has its outer end forked as at 26 and pivots 27 connect this shaft with the block. It is to be noted that the axes of the pivot connections to the block are so arranged that their intersection is at all times in the line connecting the pivots of the two part ring so that no matter how the outer section of the shaft or supplemental spindle may be swung about the pivot of the sleeve the universal joint formed by the forked ends and block will always be in position for operation so long as the angular displacement does not exceed the well known 45°.

Thus the drive shaft may have a driving gear connected thereto in the usual manner and serve to drive the front wheels whether the same be running straight ahead or moved for turning the vehicle. The usual steering arm 28 is connected to the two part ring so that the steering gear may be connected thereto for the purpose of moving the ring about its pivot.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown, but it is wished to include all such as come properly within the scope claimed.

Having thus described the invention, what is claimed as new is:—

In a device of the kind described, a hollow supporting sleeve having oppositely disposed cut-away portions at its outer end arranged to form vertically spaced ears, pivots carried by said ears, a diametrically split ring mounted on said pivots and carrying a steering arm, a hollow spindle member revolubly mounted in said ring and provided on one end with a flange to prevent movement of the member through the ring in one direction, a collar on said member to prevent movement thereof in the opposite direction through the ring, a collar ring mounted in said spindle member, a spindle adjustably projecting through said collar ring and forming a stub axle adapted to enter a wheel hub, means to hold the spindle and collar ring together in adjusted relation, a drive shaft, and a universal joint connecting the shaft and spindle and having its axis in alinement with the pivots of the diametrically split ring.

In testimony whereof, I affix my signature, in the presence of two witnesses.

FRANK E. CHURCH.

Witnesses:
O. L. OLEN,
VALBERG M. OLEN.